US011620668B2

(12) United States Patent
Marianne

(10) Patent No.: US 11,620,668 B2
(45) Date of Patent: *Apr. 4, 2023

(54) SYSTEM FOR MANAGING WEB PAGE CONTENT DISPLAY BASED ON DYNAMIC CRITERIA

(71) Applicant: PayPal, Inc., San Jose, CA (US)

(72) Inventor: Noam Marianne, Petach-Tikva (IL)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/732,765

(22) Filed: Apr. 29, 2022

(65) Prior Publication Data

US 2022/0253884 A1 Aug. 11, 2022

Related U.S. Application Data

(63) Continuation of application No. 16/399,721, filed on Apr. 30, 2019, now Pat. No. 11,379,869.

(51) Int. Cl.
*G06Q 30/00* (2012.01)
*G06Q 30/0207* (2023.01)
*G06Q 30/0601* (2023.01)

(52) U.S. Cl.
CPC ..... *G06Q 30/0222* (2013.01); *G06Q 30/0239* (2013.01); *G06Q 30/0623* (2013.01); *G06Q 30/0641* (2013.01)

(58) Field of Classification Search
CPC . G06Q 30/0207–0239; G06Q 30/0623; G06Q 30/0641
See application file for complete search history.

(56) References Cited

U.S. PATENT DOCUMENTS

| | | | |
|---|---|---|---|
| 8,645,221 B1* | 2/2014 | Sarma | G06Q 30/00 705/26.1 |
| 8,650,079 B2 | 2/2014 | Fano et al. | |
| 8,676,639 B2* | 3/2014 | Perlman | G06Q 40/02 705/14.1 |
| 9,898,735 B2* | 2/2018 | Girish | G06Q 30/0601 |
| 10,262,029 B1* | 4/2019 | Chu | G06Q 30/0269 |
| 2004/0262386 A1* | 12/2004 | Abrams | G06Q 30/02 235/383 |
| 2007/0038540 A1 | 2/2007 | Tomita et al. | |
| 2007/0239560 A1* | 10/2007 | McGuire | G06Q 30/08 705/14.46 |

(Continued)

FOREIGN PATENT DOCUMENTS

| | | | | |
|---|---|---|---|---|
| WO | 2013040591 A2 | 3/2013 | | |
| WO | WO-2013040591 A2 * | 3/2013 | ............. | G06Q 10/00 |

*Primary Examiner* — Luis A Brown
(74) *Attorney, Agent, or Firm* — Haynes and Boone, LLP

(57) ABSTRACT

A computer system detects that a first user has selected an element corresponding to accessing a particular web page (e.g. such as a checkout). Based on detecting that the first user has selected an element corresponding to accessing the web page, the computer system may determine if one or more particular criteria associated with the web page have been met. Based on determining that the one or more criteria associated with the web page have been met, the computer system causes a particular web page element (e.g. a promotional payment button) to be rendered on the web page to display on a device of the first user.

20 Claims, 7 Drawing Sheets

(56) References Cited

U.S. PATENT DOCUMENTS

| | | | |
|---|---|---|---|
| 2012/0158480 A1* | 6/2012 | Sundaram | G06Q 30/0207 705/14.23 |
| 2012/0166268 A1* | 6/2012 | Griffiths | G06Q 30/0222 705/14.23 |
| 2012/0296682 A1* | 11/2012 | Kumar | G06Q 10/00 705/7.11 |
| 2012/0296697 A1* | 11/2012 | Kumar | G06Q 30/02 705/7.29 |
| 2013/0018713 A1* | 1/2013 | Kumar | G06Q 30/0201 705/26.1 |
| 2013/0060637 A1* | 3/2013 | Walker | G06F 16/24578 705/14.58 |
| 2013/0332251 A1* | 12/2013 | Ioannidis | G06Q 20/3274 705/26.8 |
| 2013/0332305 A1* | 12/2013 | Palmer | G06Q 30/06 705/347 |
| 2014/0013420 A1* | 1/2014 | Picionielli | H04W 12/08 726/17 |
| 2014/0067513 A1* | 3/2014 | Arora | G06Q 30/02 705/14.35 |
| 2015/0100417 A1* | 4/2015 | Girish | G06Q 30/0641 705/14.51 |
| 2015/0120411 A1* | 4/2015 | Kneen | G06Q 30/0211 705/14.13 |
| 2016/0005030 A1* | 1/2016 | Girish | G06Q 20/363 705/39 |
| 2016/0140610 A1* | 5/2016 | McDonough | G06Q 30/0222 705/14.55 |
| 2016/0283925 A1* | 9/2016 | Lavu | G06Q 20/401 |
| 2017/0004481 A1* | 1/2017 | Slusser | G06Q 20/12 |
| 2019/0042653 A1* | 2/2019 | Tian | H04L 67/53 |
| 2019/0108510 A1* | 4/2019 | Bhattacharjee | G06Q 20/209 |
| 2019/0122245 A1* | 4/2019 | Sahay | G06Q 30/0222 |
| 2020/0349599 A1* | 11/2020 | Marianne | G06Q 30/0641 |
| 2021/0201300 A1* | 7/2021 | Marianne | G06Q 20/204 |

* cited by examiner

XYZ STORE

Check Out

First Name

Last Name

Address

Phone Number

| PURCHASE DETAILS | |
|---|---|
| X Laundry Detergent | $10.00 |
| SUBTOTAL | $10.00 |
| TAX 10% | $1.00 |
| TOTAL | $11.00 |

RETURN TO CART

402 — PAYMENT OPTION 1

404 — PAYMENT OPTION 2

PAYMENT OPTION 3

FIG. 4

XYZ STORE

Check Out

First Name

Last Name

Address

Phone Number

PURCHASE DETAILS

X Laundry Detergent
$10.00

SUBTOTAL $10.00

TAX 10% $1.00

TOTAL $11.00

RETURN TO CART

502 — PROMO PAYMENT

404 — PAYMENT OPTION 2

PAYMENT OPTION 3

FIG. 5

SYSTEM FOR MANAGING WEB PAGE CONTENT DISPLAY BASED ON DYNAMIC CRITERIA

CROSS REFERENCE TO RELATED APPLICATIONS

The present application is a continuation application of U.S. patent application Ser. No. 16/399,721, filed Apr. 30, 2019 and is incorporated in reference in its entirety.

TECHNICAL FIELD

The present disclosure relates to a checkout experience, and more particularly to a system and method for managing the checkout experience based on merchant criteria.

BACKGROUND

The payments landscape has changed drastically over the past decade. This is primarily due to fintech companies that have allowed consumers to have simple and frictionless shopping experiences online, while also allowing consumers to transfer money to their family and friends via their computers and mobile devices. Furthermore, by way of handling payments for a variety of merchants, fintech companies are in a unique position to handle and manage the checkout experience for their merchants. Until now, the checkout experience provided for merchants has been fairly straight forward, with the value add primarily consisting of payment buttons and payment processing provided to merchants in order to facilitate payments on behalf of merchants. Therefore, there remains a need for fintech companies to further take over the checkout experience and possibly provide alternate checkout experiences to consumers based on certain criteria.

BRIEF DESCRIPTION OF THE DRAWINGS

FIG. 4 is a depiction of a merchant interface that includes multiple payment options for a purchase, in accordance with an embodiment.

FIG. 5 is a depiction of a merchant interface that includes the rendering of a promotional payment element after one or more merchant criteria is met, in accordance with an embodiment.

DETAILED DESCRIPTION

Embodiments of the present disclosure provide a system, method, and program product. A computer system detects that a first user has selected an element corresponding to accessing a checkout page of a merchant. Based on detecting that the first user has selected an element corresponding to accessing the checkout page of the merchant, the computer system determines if one or more merchant criteria associated with the merchant have been met. Based on determining that the one or more merchant criteria associated with the merchant have been met, the computer system causes a promotional payment button to be rendered on the checkout page of the merchant displayed on a device of the first user.

A computer system detects that a user has accessed a selectable element that causes a search for a product or service. In response to the detecting that the user has accessed a first selectable element that causes the search for the product or service, the computer system determines one or more merchants that correspond to the product or service. The computer system analyzes one or more merchant criteria corresponding to the one or more merchants to determine that a first merchant of the determined one or more merchants has a highest ranking. In response to determining that the first merchant of the determined one or more merchants has the highest ranking, the computer system provides an indication to the user to complete checkout with the first merchant.

In the example embodiment, the present disclosure describes a solution that describes detecting if one or more merchant criteria or one or more specified criteria (such as a social group criteria) has been met, and if so, determining whether to render a promotional payment button. In the example embodiment, the present disclosure describes a solution that detects that a user is accessing or attempting to access a checkout page of a merchant web site, and based on the detection, the present disclosure determines if one or more merchant criteria has been met. In response to determining that the one or more merchant criteria has been met, the present disclosure describes determining other users that belong to the same group as the user, and further rendering a promotional payment button on the checkout pages corresponding to the group. Based on detecting that the user has accessed the promotional payment button, the present disclosure further describes processing the transaction and applying the promotion associated with the promotional payment button during processing.

Embodiments of the present disclosure will now be described in detail with reference to the accompanying Figures.

Figure 1:
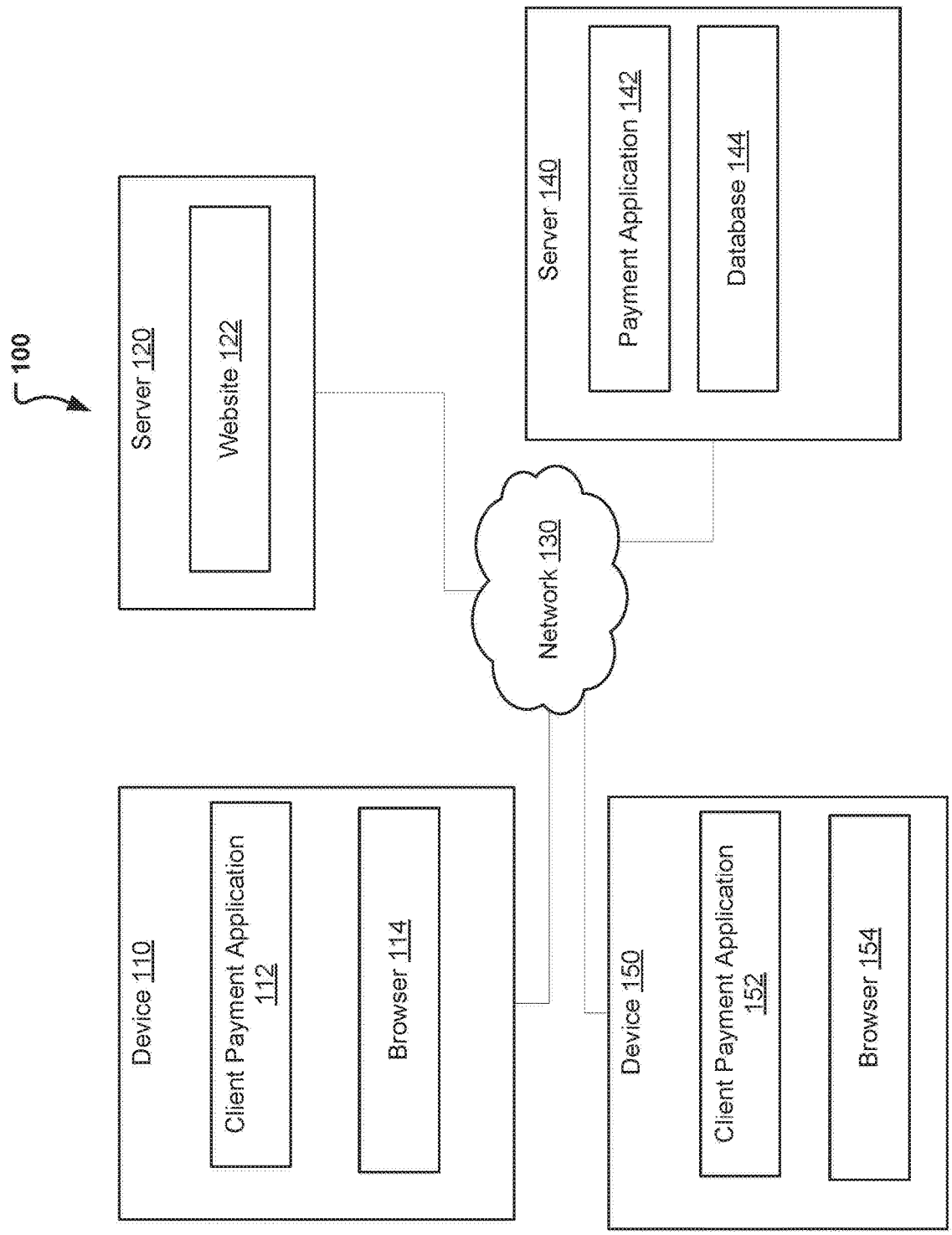
FIG. 1 illustrates a checkout system, in accordance with an embodiment.

FIG. 1 illustrates checkout system 100, in accordance with an embodiment. In the example embodiment, checkout system 100 includes device 110, server 120, server 140, and device 150 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a Bluetooth network, a local area network (LAN), or a wide area network (WAN). In general, network 130 can be any combination of connections and protocols that will support communications between computing devices, such as between device 110 and server 140.

In the example embodiment, server 120 includes website 122. In the example embodiment, server 120 may be a desktop computer, a laptop computer, a tablet computer, a mobile device, a handheld device, a thin client, or any other electronic device or computing system capable of receiving and sending data to and from other computing devices, such as device 110, via network 130. Although not shown, optionally, server 120 can comprise a cluster of servers executing the same software to collectively process requests as distributed by a front-end server and a load balancer. In the example embodiment, server 120 is a computing device that is optimized for the support of applications that reside on server 120, such as website 122, and for the support of network requests related to website 122. Server 120 is described in more detail with regard to the figures.

Website 122 is a collection of files including, for example, HTML files, CSS files, image files and JavaScript files. Website 122 can also include other resources such as audio files and video files. In the example embodiment, website 122 may support requests from other devices, such as device 110, and may further be capable of responding to received requests. Website 122 is described in more detail with regard to the figures.

In the example embodiment, device 110 includes client payment application 112 and browser 114. In the example embodiment, device 110 may be a desktop computer, a laptop computer, a tablet computer, a mobile device, a handheld device, a thin client, or any other electronic device or computing system capable of receiving and sending data to and from other computing devices, such as server 120, via network 130. Device 110 is described in more detail with regard to the figures.

In the example embodiment, client payment application 112 is a client-side application, corresponding to the server-side payment application 142, that is capable of transmitting requests to payment application 142 and is further capable of providing received information to a user of device 110 via a user interface. Client payment application 112 is described in more detail with regard to the figures.

Browser 114 is a program that enables users to view, watch, or listen to documents and other resources, such as text, audio and video files, retrieved from another device(s), such as server 120. In the example embodiment, browser 114 requests documents and other resources from website 122 on server 120 via network 130. In the example embodiment, browser 114 may be a web browser, however, in other embodiments, browser 114 may be an application that is capable of connecting with server-side application for the purpose of requesting information and displaying the information received in response to the requests. Browser 114 is described in more detail with regard to the figures.

In the example embodiment, device 150 includes client payment application 152 and browser 154. In the example embodiment, device 150 may be a desktop computer, a laptop computer, a tablet computer, a mobile device, a handheld device, a thin client, or any other electronic device or computing system capable of receiving and sending data to and from other computing devices, such as server 140, via network 130. Device 150 is described in more detail with regard to the figures.

In the example embodiment, client payment application 152 is a client-side application, corresponding to the server-side payment application 142, that is capable of transmitting requests to payment application 142 and is further capable of providing received information to a user of device 150 via a user interface. Client payment application 152 is described in more detail with regard to the figures.

Browser 154 is a program that enables users to view, watch, or listen to documents and other resources, such as text, audio and video files, retrieved from another device(s), such as server 120. In the example embodiment, browser 154 requests documents and other resources from website 122 on server 120 via network 130. In the example embodiment, browser 154 may be a web browser, however, in other embodiments, browser 154 may be an application that is capable of connecting with server-side application for the purpose of requesting information and displaying the information received in response to the requests. Browser 154 is described in more detail with regard to the figures.

In the example embodiment, server 140 includes payment application 142 and database 144. In the example embodiment, server 140 may be a desktop computer, a laptop computer, a tablet computer, a mobile device, a handheld device, a thin client, or any other electronic device or computing system capable of receiving and sending data to and from other computing devices, such as device 110, via network 130. Although not shown, optionally, server 140 can comprise a cluster of servers executing the same software to collectively process requests as distributed by a front-end server and a load balancer. In the example embodiment, server 140 is a computing device that is optimized for the support of applications that reside on server 140, such as payment application 142, and for the support of network requests related to payment application 142. Server 140 is described in more detail with regard to the figures.

In the example embodiment, database 144 is a database that includes information that corresponds to one or more merchants, such as one or more merchant criteria and one or more corresponding promotions. Furthermore, database 144 may also include information corresponding to one or more users of a payment service provider, such as the payment service provider corresponding to payment application 142. For example, database 144 may include user financial information, user authentication information, user preferences, user connections (other users that a user may be linked to, connected with, etc.), information detailing each user's transactional history, and additional user information. Furthermore, database 144 may include information that corresponds to one or more merchants, such as one or more merchant criteria and one or more corresponding promotions. Database 144 is described in more detail with regard to the figures.

In the example embodiment, payment application 142 is a server-side application, corresponding to the client-side payment applications such as client payment application 112 and client payment application 152. Payment application 142 is capable of receiving information from client payment applications and further capable of responding to requests from corresponding client payment applications. In addition, in the example embodiment, payment application 142 is capable of monitoring activity on one or more merchant websites to determine if one or more merchant criteria have been met and based on determining that one or more merchant criteria has been met, payment application 142 is capable of causing a promotional payment button to be rendered on one or more checkout pages. Furthermore, based on determining that a rendered promotional payment button has been accessed, payment application 142 is capable of processing the associated transaction and also capable of identifying and applying a corresponding promotion to the transaction during payment processing. Payment application 142 is described in more detail with regard to the figures.

Furthermore, in one or more embodiments, payment application 142 may utilize an application programming interface (API) in communicating with other programs, and further in communicating with database 144.

Figure 2:
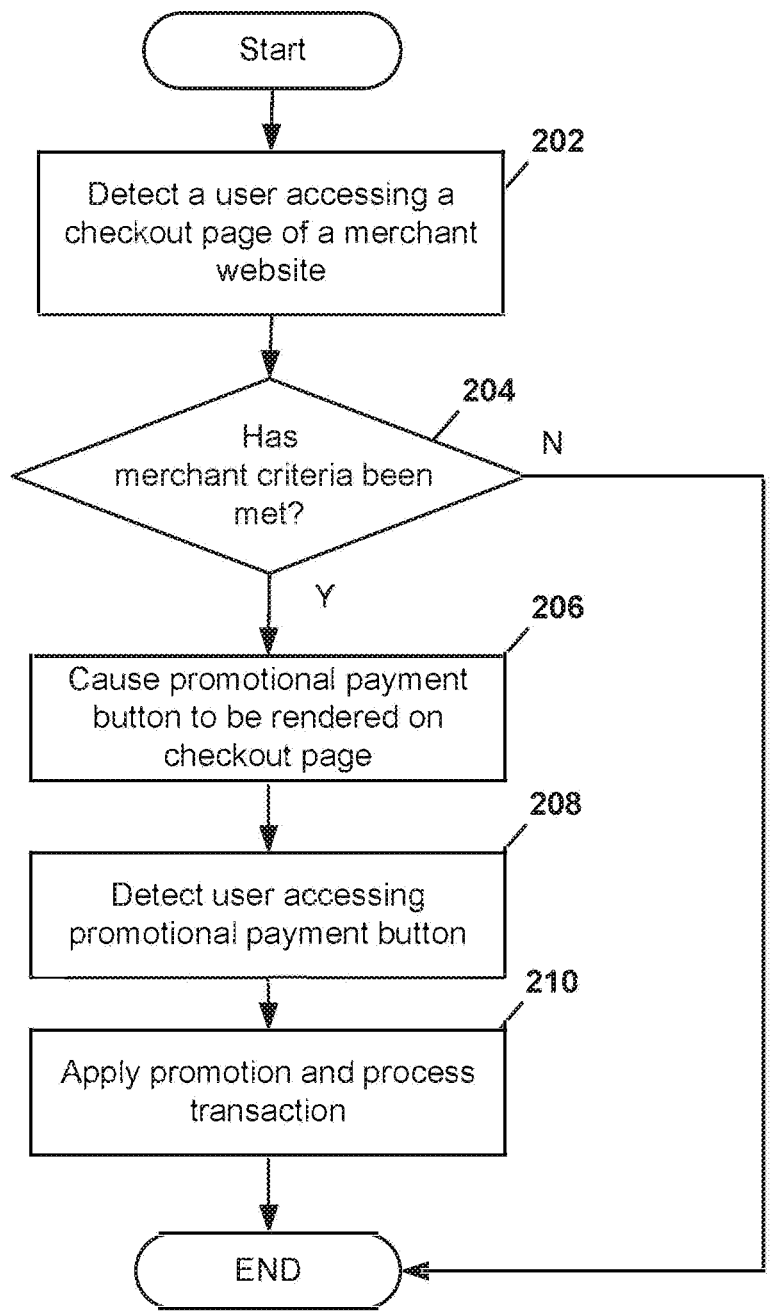
FIG. 2 is a flowchart illustrating the operations of the payment application of FIG. 1 in rendering a promotional payment element based on detection of a merchant criteria being met, in accordance with an embodiment.

FIG. 2 is a flowchart illustrating the operations of payment application 142 in rendering a promotional payment interface element based on detection of a merchant criteria being met, in accordance with an embodiment. In the example embodiment, payment application 142 monitors one or more merchant websites (and/or applications). In the example embodiment, payment application 142 may detect that a user, such as the user of device 110, has selected a user interface element that corresponds to accessing a checkout page of a merchant website, such as website 122 (from the one or more monitored merchant websites) (step 202). For example, the user interface element may be a "checkout" button on a product listing page. In the example embodiment, payment application 142 may communicate with website 122 in order to monitor and identify that the user of device 110 has selected a user interface element that corresponds to accessing the checkout page of website 122. In other embodiments, each client payment application, such as client payment application 112, may monitor local activity on each respective device and provide the information to payment application 142.

In the example embodiment, payment application 142 determines if one or more merchant criteria corresponding to a merchant associated with website 122 has been met via the detected activity by the user of device 110 (decision 204). In the example embodiment, payment application 142 may manage promotions within the checkout experience for one or more merchants. Payment application 142 may receive merchant criteria from each of the one or more merchants, and further store the merchant criteria (and their corresponding promotional information) in database 144 in association with the corresponding merchant. Therefore, in the example embodiment, payment application 142 may detect that the user of device 110 is accessing a checkout page of website 122, and based on the detecting, access database 144 and identify the merchant criteria associated with the merchant associated with website 122. In the example embodiment, payment application 142 may then identify the information associated with the user activity and identify if any of the merchant criteria are met. For example, a merchant criterion may be, to discount a product by 15% for the first 100 customers to purchase by a certain date/time. Another example of a merchant criterion may be, a discount for a product based on detecting that a threshold number of users have purchased the product (such as within a threshold period of time) or currently have the product in their digital shopping cart. In another example, a merchant criterion may be a discount for a product based on detecting that a threshold number of social media friends or connected users have purchased the product (such as within a threshold period of time) or currently have the product in their digital shopping cart. In this example, payment application 142 may communicate with a social media server to identify that one or more identified users are connected users (or social media friends). A further example of a merchant criterion may be if a product has not been purchased for a period of threshold period of time, a discount may be triggered upon a user adding the product to a digital shopping cart. In an additional example, a merchant criterion may be a discount based on detecting a threshold number of users of a specific (or one or more specific) service providers have purchased the product (such as within a threshold period of time) or currently have the product in their digital shopping cart. Other examples of merchant criteria may include discounts for products that have demand, discounts for a certain customer (such as the $100^{th}$ customer) to a add a product to a digital shopping cart, discounts for products that have high inventory, discounts if a product is expiring or if a new model release is impending, discounts if a threshold number of purchases have been made by a customer at a merchant website or location with a threshold period of time, or additional merchant criteria. In other embodiments, payment application 142 may also take into account a number of users that are purchasing or have purchased a product/service within a threshold period of time within a physical store location. For example, if a merchant criterion corresponds to detecting that a threshold number of users are associated with a product or service (such as have the product/service in their digital cart or have purchased the product or service within a threshold period of time), payment application 142 may take users/customers that have purchased the product/service (or are currently checking out or are present) in a physical store into account when determining if the threshold is met or exceeded. In the example embodiment, the list above is not intended to be exhaustive and may include additional merchant criteria.

Furthermore, while several of the above examples of merchant criteria are based on detecting one or more users have purchased a product/service (or are currently in the process of checking out with regard to the product/service), in other embodiments, the merchant criteria may be based on detecting one or more users visiting a merchant website or within a merchant physical location. For example, a merchant criterion may be a discount based on detecting a threshold number of users of a specific service provider (or one or more specific service providers) are currently on a merchant website, such as website 122, or are currently present within a physical location of the merchant associated with website 122 (or a combination of both). In the example embodiments, detecting one or more users within the physical location of the merchant may be achieved via cameras within the store (in conjunction with image recognition technology), accessing a GPS module on the devices of the one or more users, or other known techniques.

If payment application 142 determines that one or more merchant criteria associated with website 122 has not been met (decision 204, "NO" branch), payment application 142 may continue to monitor user activity across one or more merchant websites as stated above.

If payment application 142 determines that one or more merchant criteria associated with website 122 has been met (decision 204, "YES" branch), payment application 142 may cause a promotional payment button to be rendered on a checkout page of website 122 displayed by browser 114 (step 206). In the example embodiment, payment application 142 may control a portion of the checkout page of website 122 corresponding to one or more payment buttons corresponding to the service provider associated with payment application 142. In this example embodiment, payment application 142 may directly render the promotional payment button on the checkout page of website 122 displayed by browser 114 upon determination that the one or more merchant criteria has been met.

Additionally, in the example embodiment, payment application 142 may identify one or more other users (or a group) that may correspond to the one or more merchant criteria being met. For example, a merchant criterion associated with the merchant corresponding to website 122 may include a 15% discount if 100 users add a first product to a digital shopping cart within a period of time (such as an hour). Therefore, in this example, the user of device 110 adding the first product to the digital shopping cart may trigger the merchant criterion being met (i.e., the user of device 110 may be the $100^{th}$ user). Therefore, payment application 142 may identify the other 99 users that correspond to the merchant criterion being met, and further may render the promotional payment button on the checkout page of website 122 being displayed on their devices as well. Furthermore, in one or more embodiments, a user, such as the user of device 150, may be identified as part of the one or more users that correspond to the one or more merchant criteria being met, but may already have a non-promotional (or normal) checkout button displayed on the checkout page of website 122. In these one or more embodiments, payment application 142 may update the displayed checkout page so that the promotional payment button is rendered in place of the non-promotional payment button (or in other embodiments, may render the promotional payment button along with the non-promotional payment button). In other words, the checkout button may be updated (with the promotional button being rendered), but the rest of the rendered checkout page may remain unchanged.

In addition, in one or more embodiments, each merchant criterion of the one or more merchant criterion may be grouped separately. In other words, users that correspond to a first merchant criterion may be grouped separately from users that correspond to a second merchant criterion for the purpose of determining if the first or the second merchant criteria has been met.

In the example embodiment, payment application 142 may detect that the user of device 110 has accessed the promotional payment button (step 208). In the example embodiment, upon accessing the promotional payment button, a payment request may be transmitted to payment application 142, however, additional information may also be transmitted along with the payment request. For example, the additional information may denote that the promotional payment button was accessed in order to initiate the payment and further may indicate which merchant criteria was met which led to the rendering of the promotional payment button.

Therefore, in the example embodiment, upon receiving the payment request, payment application 142 may cross-reference the additional information (such as merchant information and which merchant criteria was met) with database 144 in order to identify the corresponding promotion that is applicable to the payment. Payment application 142 may then apply the promotion and process the transaction (step 210). In the example embodiment, the application of the promotion may be done during the processing of the transaction, and therefore, the discount may not be applied prior to the promotional payment button is accessed and the payment request is transmitted. Furthermore, in one or more embodiments, during the processing, payment application 142 may provide a notification of the updated transactional price to the user of device 110 (with the promotional discount applied) and also provide the option to the user of device 110 to proceed with the transaction (or cancel the transaction).

Furthermore, in additional embodiments, payment application 142 may have multiple promotional payment buttons with each button being associated with a merchant criterion or multiple merchant criteria of the one or more merchant criteria. Therefore, in one or more embodiments, database 144 may maintain information that corresponds to one or more promotional payment buttons with each promotional payment button corresponding to one or more merchant criteria (and one or more promotions). For example, accessing a first checkout button may cause a payment flow that applies a 15% discount to a purchase price. In this example, payment application 142 may not be required to identify a promotion associated with the promotional payment button as each promotional payment button is directly associated with a specific payment flow (and discount). Therefore, referring to FIG. 2, when determining that a merchant criterion has been met, payment application 142 may then reference database 144 and identify a specific promotional payment button that corresponds to the merchant criterion and cause the specific promotional payment button to be rendered on the checkout page displayed on device 110 (and may render on checkout pages of associated devices as described above).

Figure 3:
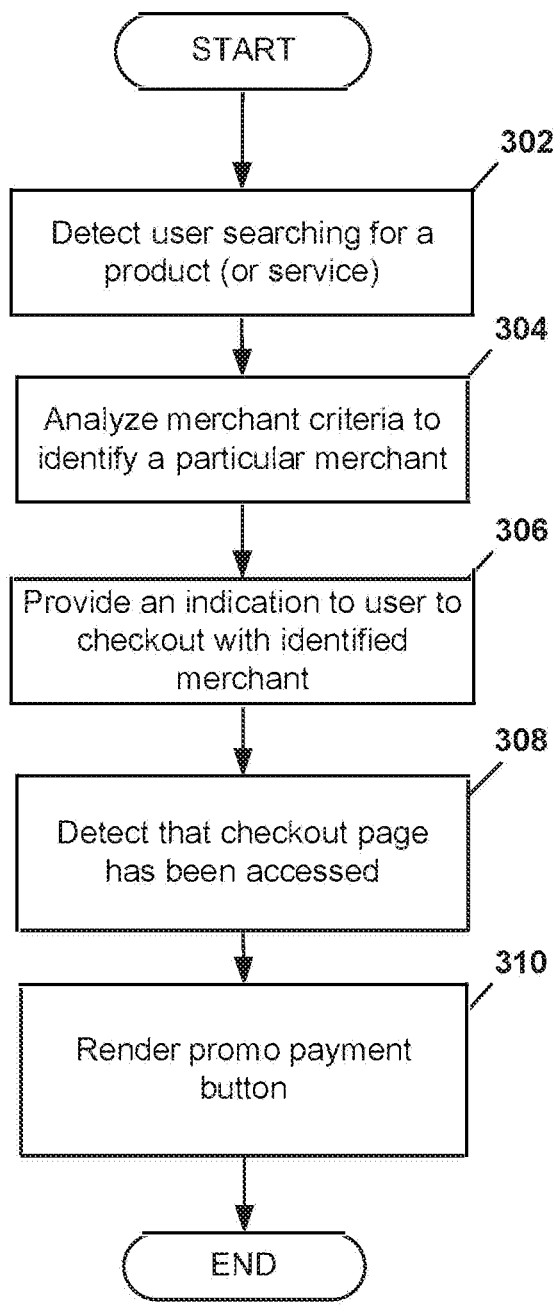
FIG. 3 is a flowchart illustrating the operations of the payment application of FIG. 1 in providing an indication to a user to checkout with a specific merchant based on analyzing merchant criteria, in accordance with an embodiment.

FIG. 3 is a flowchart illustrating the operations of payment application 142 in providing an indication to a user to checkout with a specific merchant based on analyzing merchant criteria, in accordance with an embodiment. In the example embodiment, payment application 142 detects that the user of device 110 is searching for a product (or service) (step 302). In the example embodiment, each client payment application, such as client payment application 112, may monitor local activity on each respective device and provide the information to payment application 142. In other embodiments, payment application 142 may communicate with one or more servers associated with the search engine or a website in order to monitor user activity associated with one or more users.

In the example embodiment, payment application 142 may analyze one or more merchant criteria associated with the product and/or service searched via the search engine/ web site in order to identify a particular merchant (step 304). In the example embodiment, payment application 142 may determine one or more merchants that correspond to the search product and/or service. In one or more embodiments, payment application 142 may cross-reference the search engine results against information in database 144 to identify one or more merchants that correspond to the service provider associated with payment application 142. In other embodiments, the determined one or more merchants may also include merchants that do not correspond to the service provider associated with payment application 142.

Furthermore, in the example embodiment, payment application 142 may reference database 144 to identify the merchant criteria corresponding to each of the determined one or more merchants, and further determine if one or more merchant criteria corresponding to each of the determined one or more merchants has been met or would be met if the user of device 110 took one or more steps to complete the purchase of the searched product and/or service with the respective merchant. For example, payment application 142 may identify if a user activity such as the user of device 110 proceeding to a website of a first merchant, adding the product/service to a digital shopping cart and proceeding to a checkout page would satisfy one or more merchant criteria associated with the first merchant.

Once payment application 142 has analyzed merchant criteria corresponding to each of the determined one or more merchants, payment application 142 may determine a particular merchant to recommend to the user of device 110 based on at least an identified price (or adjusted price) associated with the product and/or service. In the example embodiment, payment application may identify an adjusted price for the product/service by taking into account any promotions that are available or that may be triggered if the user proceeding with making the purchase with the particular merchant (based on one or more merchant criteria being met). For example, the determined one or more merchants may include a first merchant and a second merchant, with the first merchant selling a first product for $10 and the second merchant selling the first product for $15. However, in determining which merchant to recommend, payment application 142 may further identify if one or more merchant criteria would be triggered if the user of device 110 proceeded with purchasing the first product from each of the merchants. If, for example, proceeding with the purchase with the second merchant triggers a merchant criterion being met that corresponds to 100 users adding the first product to their carts within a 10 minute period, payment application 142 may further reference database 144 to identify the promotion that corresponds to the merchant criterion. If, for example, the promotion that corresponds to the merchant criterion is a 50% discount, payment application 142 may determine that the adjusted price for the first product with regard to the second merchant is $7.50, and therefore, may determine to recommend the second merchant. In other embodiments, the user of device 110 may determine a hierarchy or ranking of the determined one or more merchants based at least on the price (or adjusted price) with respect to the product/service at each merchant.

In the example embodiment, payment application 142 may provide an indication to the user of device 110 to complete the purchase with the identified particular merchant (step 306). In the example embodiment, payment application 142 may provide a pop-up or notification to the user of device 110, for example via client payment application 112 or within browser 114 (via an integration). Furthermore, payment application 142 may provide a selectable element within the indication (such as within the pop-up or notification) that, if accessed, causes the launching, on user device 110, of a checkout page for the product/service within a website or application page of the particular merchant. In other embodiments, payment application 142 may provide an SMS, an email, or a notification via an alternative medium. In further embodiments, payment application 142 may provide an indication within the search page, by for example highlighting a hyperlink associated with the recommended particular merchant or providing another user interface indication.

In the example embodiment, payment application 142 may determine that the checkout page for the product/service corresponding to the particular merchant is being accessed by the user of device 110 (step 308). For example, payment application 142 may detect that a selectable element included in the provided indication has been accessed by the user of device 110. Based on detecting that the checkout page for the product/service corresponding to the particular merchant is being accessed by the user of device 110, payment application 142 may render the promotional payment button, in the manner described above (step 310). Furthermore, in one or more embodiments, as described above, payment application 142 may identify one or more other users (or a group) that may correspond to the one or more merchant criteria being met. Therefore, in one or more embodiments, a user, such as the user of device 150, may be identified as part of the one or more users that correspond to the one or more merchant criteria being met, but may already have a non-promotional (or normal) checkout button displayed on the checkout page of website 122. In these one or more embodiments, payment application 142 may update the displayed checkout page so that the promotional payment button is rendered in place of the non-promotional payment button (or in other embodiments, may render the promotional payment button along with the non-promotional payment button). In other words, the checkout button may be updated (with the promotional button being rendered), but the rest of the rendered checkout page may remain unchanged.

FIG. 4 is a depiction of a merchant interface that includes multiple payment options for a purchase, in accordance with an embodiment. In the example embodiment, FIG. 4 depicts a merchant interface that includes payment button 402 and payment button 404. Furthermore, in the example embodiment, FIG. 4 depicts a payment user interface that may be rendered if payment application 142 determines that one or more merchant criteria corresponding to the merchant associated with XYZ store has not been met (and therefore no promotional payment button is rendered).

FIG. 5 is a depiction of a merchant interface that includes the rendering of a promotional payment element after one or more merchant criteria is met, in accordance with an embodiment. In the example embodiment, FIG. 5 includes promotional checkout/payment button 502 and payment button and payment button 404. In the example embodiment, based on determining that one or more merchant criteria corresponding to the merchant associated with XYZ store has been met, payment application 142 may render promotional checkout/payment button 502 in place of payment button 402. In the example embodiment, upon detecting that the user of device 110 has accessed a selectable element corresponding to accessing the checkout page of the merchant corresponding to XYZ store and determining that the one or more merchant criteria has been met, payment application 142 may render promotional payment button 502 in the initial rendering of the checkout page. In other embodiments, payment application 142 may update all or the portion of the checkout page corresponding to payment button 402 so that payment button 402 is replaced with promotional payment button 502. In some instances, as described above, the one or more merchant criteria may be met after the checkout page has already been loaded (such as if the one or more merchant criteria is met based on the actions of another user), and therefore, the all or a portion of the checkout page may be updated as described above.

Figure 6:
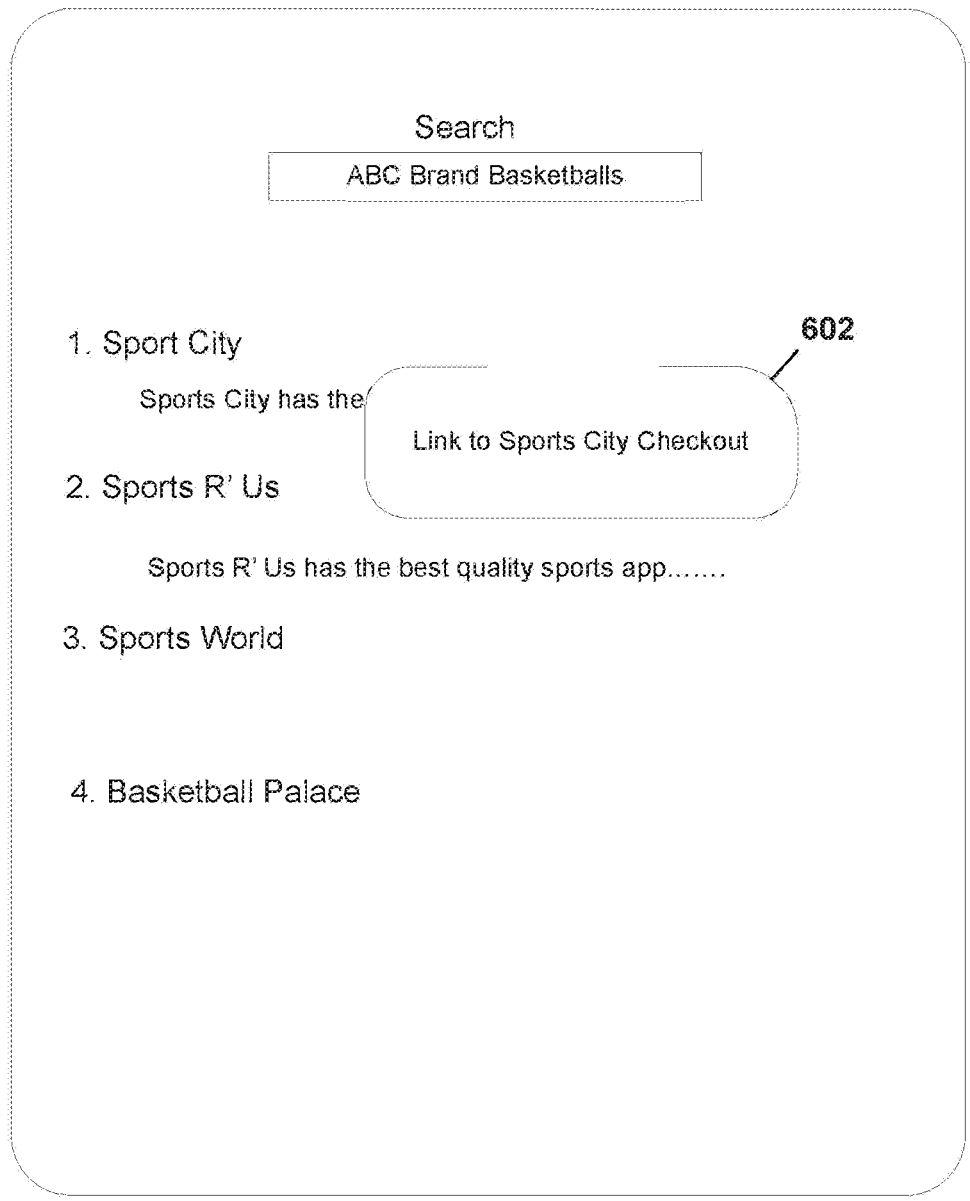
FIG. 6 is a depiction of a search engine interface that includes an indication to checkout with a specific merchant based on an analysis of merchant criteria, in accordance with an embodiment.

FIG. 6 is a depiction of a search engine interface that includes an indication to checkout with a specific merchant based on an analysis of merchant criteria, in accordance with an embodiment. In the example embodiment, FIG. 6 includes indication 602 that further provides a selectable element corresponding to a particular merchant (i.e., Sports City). As described above, based on a product/service being searched for, such as in a search engine, payment application 142 may determine one or more merchants that correspond to the product/service and further determine a particular merchant from the one or more merchants based on an associated ranking or weight value (which may be based on a cost of the product/service). Within this determination, payment application 142 may determine if one or more merchant criteria may be met by the user proceeding with checkout with the merchant, which may trigger a promotion and further reduce the cost of the product/service. Payment application 142 may take the promotions into account when providing an indication of a particular merchant. Furthermore, while not depicted in FIG. 6, payment application 142 may provide the promotional information within the indication and may further provided all or a portion of the ranking/hierarchy of merchants for the product/service (and may also provide the associated cost of the product/service).

In one or more embodiments, while in the example embodiment, payment application 142 monitors, checks to determine if a user has accessed a checkout page of merchant websites, and further may render a promotional payment button on a checkout page of a merchant based on determining that one or more merchant criteria have been met, in other embodiments payment application 142 may also monitor user activity within merchant applications, detect if a user has accessed a checkout application page, and further may render a promotional payment button within the checkout application page based on determining that the one or more merchant criteria have been met. Furthermore, in additional embodiments, a merchant criterion may correspond to more than one merchant, and therefore, payment application 142 may monitor user activity across multiple merchant websites/applicants and physical locations in order to determine if the merchant criterion has been met.

Furthermore, in one or more embodiments, along with determining if one or more merchant criteria has been met, payment application 142 may maintain additional criteria, created by the service provider associated with payment application 142 (or another service provider), which may be utilized in a similar manner as described above in determining whether to apply a promotion and/or render a promotional payment button. Therefore, payment application 142 may determine if one or more additional criteria has been met, and determine whether to render a promotional payment button based on the determination, in a similar manner as described above.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 7:
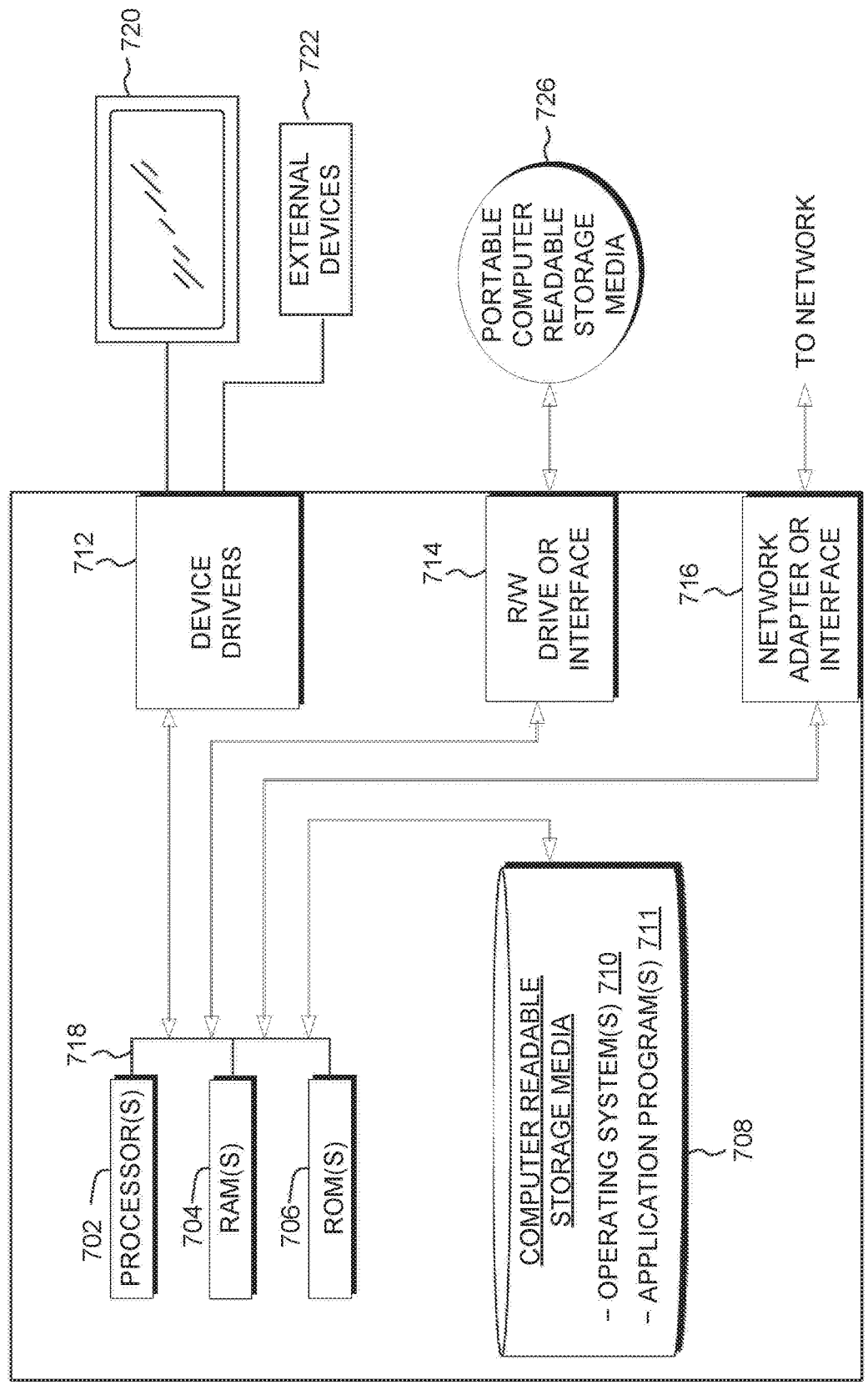
FIG. 7 is a block diagram depicting the hardware components of the checkout system of FIG. 1, in accordance with an embodiment.

FIG. 7 depicts a block diagram of components of computing devices contained in checkout system 100 of FIG. 1, in accordance with an embodiment. It should be appreciated that FIG. 7 provides only an illustration of one implementation and does not imply any limitations with regard to the environments in which different embodiments may be implemented. Many modifications to the depicted environment may be made.

Computing devices may include one or more processors 702, one or more computer-readable RAMs 704, one or more computer-readable ROMs 706, one or more computer readable storage media 708, device drivers 712, read/write drive or interface 714, network adapter or interface 716, all interconnected over a communications fabric 718. Communications fabric 718 may be implemented with any architecture designed for passing data and/or control information between processors (such as microprocessors, communications and network processors, etc.), system memory, peripheral devices, and any other hardware components within a system.

One or more operating systems 710, and one or more application programs 711, for example, payment application 142, are stored on one or more of the computer readable storage media 708 for execution by one or more of the processors 702 and by utilizing one or more of the respective RAMs 704 (which typically include cache memory). In the illustrated embodiment, each of the computer readable storage media 708 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 714 to read from and write to one or more portable computer readable storage media 726. Application programs 711 on the computing devices may be stored on one or more of the portable computer readable storage media 726, read via the respective R/W drive or interface 714 and loaded into the respective computer readable storage media 708.

Computing devices may also include a network adapter or interface 716, such as a TCP/IP adapter card or wireless communication adapter (such as a 4G wireless communication adapter using OFDMA technology). Application programs 711 on the computing devices may be downloaded to the computing devices from an external computer or external storage device via a network (for example, the Internet, a local area network or other wide area network or wireless network) and network adapter or interface 716. From the network adapter or interface 716, the programs may be loaded onto computer readable storage media 708. The network may comprise copper wires, optical fibers, wireless transmission, routers, firewalls, switches, gateway computers and/or edge servers.

Computing devices may also include a display screen 720, and external devices 722, which may include, for example a keyboard, a computer mouse and/or touchpad. Device drivers 712 interface to display screen 720 for imaging, to external devices 722, and/or to display screen 720 for pressure sensing of alphanumeric character entry and user selections. The device drivers 712, R/W drive or interface 714 and network adapter or interface 716 may comprise hardware and software (stored on computer readable storage media 708 and/or ROM 706).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system, comprising:
a processor; and
a non-transitory computer-readable storage medium having stored thereon instructions that are executable to cause the computer system to perform operations comprising:
detecting that a first user has selected an element corresponding to accessing a checkout page of a web site associated with a merchant, wherein the first user is a user of a first service provider, and wherein the first service provider is different from the merchant;
based on detecting, during a first time period, that the first user has selected an element corresponding the checkout page of the merchant, determining if one or more merchant criteria associated with the merchant have been met, wherein the determining if the one or more merchant criteria has been met includes:
determining that a quantity of other user accounts corresponding to users of the first service provider have accessed the website associated with the merchant, during the first time period, in an amount that exceeds a threshold number;
determining that a group of one or more of the other user accounts are interconnected with the first user via a plurality of account connections with the first user, wherein an indication of the plurality of account connections is accessible to the first service provider; and
determining that members of the group of other user accounts have each selected one or more page elements on the website associated with the merchant that cause an item to be placed in a respective digital shopping cart for the website or cause display of the item on the website along with an option to purchase the item via the website; and based on determining that the one or more merchant criteria associated with the merchant have been met, causing a promotional payment button to be rendered on the checkout page of the website displayed on a device of the first user, wherein the promotional payment button corresponds to the item.

2. The computer system of claim 1, wherein the operations further comprise:
causing the promotional payment button to be rendered on one or more devices corresponding to the group of other user accounts.

3. The computer system of claim 2, wherein the operations further comprise:
prior to causing the promotional payment button to be rendered on one or more devices corresponding to the group of other user accounts, verifying that the one or more merchant criteria have been met for each user corresponding to the one or more devices.

4. The computer system of claim 1, wherein the indication of the plurality of account connections is received from another entity by the first service provider via the Internet.

5. The computer system of claim 1, wherein the one or more merchant criteria include a limited timeframe in which the promotional payment button is allowed to be displayed.

6. The computer system of claim 1, wherein the one or more merchant criteria include a limited quantity of users to which the promotional payment button is allowed to be displayed.

7. A method, comprising:
detecting, at a computer system, that a first user has selected an element corresponding to accessing a checkout page of a website associated with a merchant, wherein the first user is a user of a first electronic payment service provider;
based on detecting, during a first time period, that the first user has selected an element corresponding the checkout page of the merchant, determining if one or more merchant criteria associated with the merchant have been met, wherein the determining if the one or more merchant criteria has been met includes:
determining that a quantity of other user accounts corresponding to users of the first service provider have accessed the website associated with the merchant, during the first time period, in an amount that exceeds a threshold number;
determining that a group of one or more of the other user accounts are interconnected with the first user via one or more account connections with the first user, wherein an indication that the group of other user accounts are interconnected is accessible to the first service provider; and
determining that members of the group of other user accounts have each selected one or more page elements on the website associated with the merchant that cause an item to be placed in a respective digital shopping cart for the web site or cause display of the item on the web site along with an option to purchase the item via the website; and
based on determining that the one or more merchant criteria associated with the merchant have been met, causing a promotional payment button to be rendered on the checkout page of the website displayed on a device of the first user, wherein the promotional payment button corresponds to the item.

8. The method of claim 7, further comprising:
causing the promotional payment button to be rendered on one or more devices corresponding to the group of other user accounts.

9. The method of claim 8, further comprising:
prior to causing the promotional payment button to be rendered on one or more devices corresponding to the group of other user accounts, verifying that the one or more merchant criteria have been met for each user corresponding to the one or more devices.

10. The method of claim 7, wherein the indication that the group of other user accounts are interconnected is received from another entity by the first service provider via the Internet.

11. The method of claim 7, wherein the first electronic payment service provider is different from the merchant.

12. The method of claim 7, wherein the one or more merchant criteria include a limited timeframe in which the promotional payment button is allowed to be displayed.

13. The method of claim 7, wherein the one or more merchant criteria include a limited quantity of users to which the promotional payment button is allowed to be displayed.

14. The method of claim 7, wherein the group of one or more of the other user accounts comprises a plurality of users accounts interconnected with the first user via a plurality of different account connections with the first user.

15. A non-transitory computer-readable storage medium having stored thereon instructions that are executable to cause a computer system to perform operations comprising:
detecting that a first user has selected an element corresponding to accessing a checkout page of a web site associated with a merchant, wherein the first user is a user of a first service provider, and wherein the first service provider is different from the merchant;
based on detecting, during a first time period, that the first user has selected an element corresponding the checkout page of the merchant, determining if one or more merchant criteria associated with the merchant have been met, wherein the determining if the one or more merchant criteria has been met includes:
determining that a quantity of other user accounts corresponding to users of the first service provider have accessed the website associated with the merchant, during the first time period, in an amount that exceeds a threshold number;
determining that a group of one or more of the other user accounts are interconnected with the first user via a plurality of account connections with the first user, wherein an indication of the plurality of account connections is accessible to the first service provider; and
determining that members of the group of other user accounts have each selected one or more page elements on the website associated with the merchant that cause an item to be placed in a respective digital shopping cart for the web site or cause display of the item on the web site along with an option to purchase the item via the website; and
based on determining that the one or more merchant criteria associated with the merchant have been met, causing a promotional payment button to be rendered on the checkout page of the website displayed on a device of the first user, wherein the promotional payment button corresponds to the item.

16. The non-transitory computer-readable storage medium of claim 15, wherein the one or more merchant criteria include a limited timeframe in which the promotional payment button is allowed to be displayed.

17. The non-transitory computer-readable storage medium of claim 15, wherein the operations further comprise:
   causing the promotional payment button to be rendered on one or more devices corresponding to the group of other user accounts.

18. The non-transitory computer-readable storage medium of claim 17, wherein the operations further comprise:
   prior to causing the promotional payment button to be rendered on one or more devices corresponding to the group of other user accounts, verifying that the one or more merchant criteria have been met for each user corresponding to the one or more devices.

19. The non-transitory computer-readable storage medium of claim 15, wherein the operations further comprise:
   determining that a group of one or more of the other user accounts are interconnected with the first user via a social media network.

20. The non-transitory computer-readable storage medium of claim 15, wherein the indication of the plurality of account connections is received from another entity by the first service provider via the Internet.

* * * * *